Figure 1:
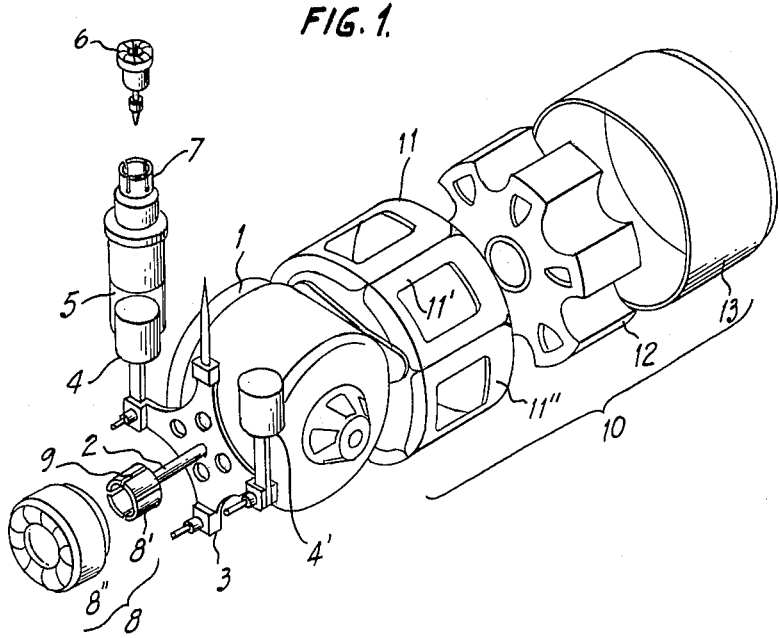

March 8, 1966 W. MÖLLER 3,239,166

AUTOMATIC PILOT

Filed Sept. 25, 1963

United States Patent Office 3,239,166
Patented Mar. 8, 1966

3,239,166
AUTOMATIC PILOT
Waldemar Möller, Überlingen (Bodensee), Germany, assignor to Bodenseewerk Perkin-Elmer & Co. G.m.b.H., Überlingen (Bodensee), Germany
Filed Sept. 25, 1963, Ser. No. 311,519
Claims priority, application Germany, Sept. 26, 1962, B 68,982
2 Claims. (Cl. 244—79)

The invention relates to an automatic pilot for stabilizing the flying position of a flying object about one axis each. Conventional automatic pilots have a free gyroscope as position pick-up, from which a signal is applied to a rudder servomotor through a power amplifier in case of position deviation. A rudder deflection for correcting the position deviation is produced by the rudder servomotor.

It is known to determine the angular velocity about the axis to be stabilized by means of a fettered gyroscope, and, additionally, to impress a signal proportional thereto on the rudder servomotor through the power amplifier. As is well-known, the precession deflection of a gyroscope precessing against the restoring force is proportional to the angular velocity about the response axis, so that a signal proportional to the precession deflection, that is to say, the angular velocity, can be derived from a position pick-off of the precession axis. Thus, with an automatic pilot of conventional construction, a free gyroscope as position pick-up and a fettered gyroscope as rate pick-up are present, and both are provided with position pick-offs. Position pick-offs in the simplest case are potentiometers from which a voltage proportional to the angle of rotation of the axis is obtained. For the purpose of greater accuracy, inductive or other pick-off systems are used instead of potentiometers as position pick-offs. With today's flying craft, the damping of the stabilization is primarily effected by the signals of the rate pick-up, whereas the signals of the position pick-up serve for steering.

Automatic pilots are known wherein two servomotors engage at the rudder through a mechanical summation device such as a three-point lever means. With such an arrangement it is possible to control one servomotor in accordance with the position deviation, and the other in accordance with the angular velocity (rate of change of position) through separate amplifiers. This is advantageous in that the servomotors and the amplifiers may be dimensioned differently and that the relatively quick movements of the servomotor controlled by the rate pick-up may not affect the other servomotor which corrects the existing position deviation by slower correcting movements. Thus, the latter may be connected with a manually operated control stick, whereby steering signals can also be supplied, if necessary. An automatic pilot system with a free position pick-up gyroscope and a fettered angular velocity gyroscope, which operate with separate rudder servomotors, however, is a relatively complicated device, susceptible to interferences.

It is an object of the present invention to simplify such an automatic pilot system, maintaining and improving, respectively, its advantageous properties, and to reduce considerably the hitherto necessary expense.

Figure 2:
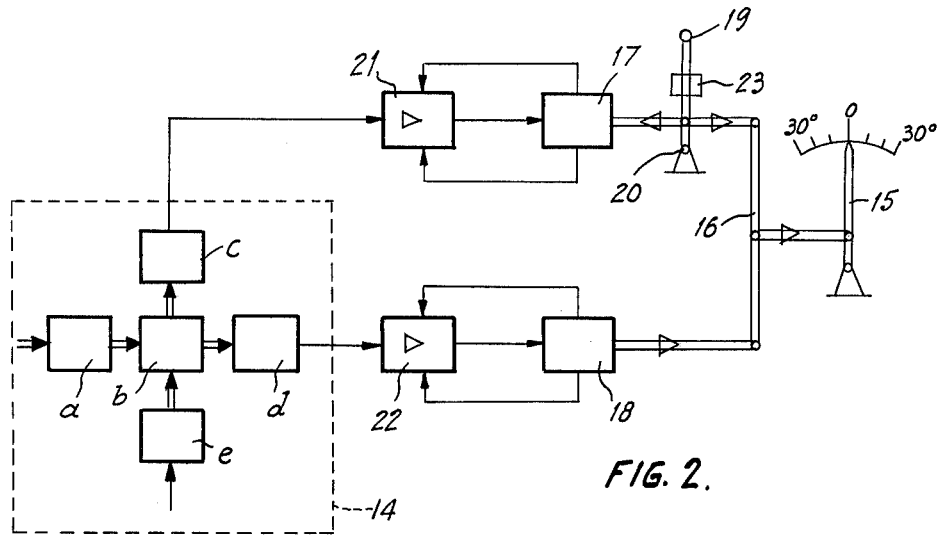

Still other objects and advantages of my invention will be apparent from the specification. The features of novelty which I believe to be characteristic of my invention are set forth with particularity in the appended claims. My invention itself, however, both as to its fundamental principles and as to its particular embodiments, will best be understood by reference to the specification and accompanying drawing, in which FIG. 1 presents a diagram of an integrating gyroscope with the pick-off systems thereof according to my invention; and FIG. 2 is a block diagram of the automatic pilot.

According to this invention, the objects are attained by providing (1) a position deviation signal and (2) an angular velocity signal derived from separate pick-offs of one and the same precessing gyroscope, the deflection of which is made proportional to the position deviation by an integrating damping device, and wherein the first signal proportional to the angle of deflection is obtained at a position pick-off, and the second signal is obtained at a dynamic pick-off, which is proportional to the deflection rate. Thus, only one gyroscope of special design is required, including two differently acting pick-offs, so as to derive separate signals for the two servomotors. If the precession torque of a gyroscope is made to act against a damping piston with defined outlet, then a precession deflection is obtained, which is proportional to the integral of the precession torques. However, since the precession torque of the gyroscope corresponds to the angular velocity about the response axis, the integral, that is to say, the precession deflection, represents the angular deviation, that is to say, the position error. Therefore, the position error signal may be derived from a position pick-off controlled by the precession axis, say, a potentiometer or another pick-off system, and impressed on the one rudder servomotor through an amplifier.

In contrast to a potentiometer pick-off, a dynamic pick-off is a pick-off system wherein an inductance coil is moved in a magnetic field by the rotary movement to be converted into a signal. A voltage proportional to the angular velocity is then induced in the inductance coil as signal voltage. With such a dynamic pick-off, therefore, a signal is obtained corresponding to the differential quotient of the rotary movement. Thus, it is possible to derive the angular velocity signal to be impressed on the second rudder servomotor from the precession axis of the described integrating gyroscope by an additional dynamic pick-off.

A prerequisite for an unobjectionable flight control of this type is that the servomotors follow the signal changes without inertia, which is generally the case when using hydraulic servomotors with relatively low inertia. If, however, rudder motors are used, which are susceptible to inertia, it is necessary to operate with additional lead signals. As is well known, such additional lead signals are obtained by superimposing on the original lead signal a signal corresponding to the time derivative thereof. This means that the one servomotor is controlled by a signal which corresponds to the position deviation plus angular velocity, whereas the second servomotor is supplied with a signal which is composed of angular velocity plus angular acceleration.

Such signaling is obtainable with the hereinbefore described automatic pilot by arranging that the precessing gyroscope deflects against the action of an elastically integrating restoring device. If, in a precessing gyroscope, an elastic restoring force in form of mechanical pneumatic or electric springs is provided, in addition to the integrating damping device, the precession deflection corresponds to a sum value composed of position deviation and angular velocity, which value is derived from the precession axis by means of a position pick-off and may be impressed on the one servomotor. It is possible to have the sum value represented by the precession deflection differentiated by means of the dynamic pick-off so that a signal may be derived from the dynamic pick-off of the precession axis, which corresponds to the angular velocity plus angular acceleration, and be impressed on the second servomotor.

Through adequate selection (integration opening and elastic element, respectively) of the signal coefficients, it is then possible to effect an unobjectionable flight control even when using rubber motors which are subjected to inertia.

The automatic pilot of the invention, the primary object of which is to stabilize the flying position, if interferences from without are arising, however, also permits the feeding of steering signals by the airplane pilot. If a torque generator is connected to the precession axis of the gyroscope, which may be controlled by a manually operated steering signal pick-up, then a rotation of the precession axis may thereby be effected, which, due to the described stabilization operations, leads to a change in position of the flying craft. Frequently it is desirable to have the steering signal pick-up derived from a control stick connected to the rudder lever means so as to immediately manually stabilize and steer the airplane, the automatic pilot being disconnected.

If, however, the steering signal pick-up is connected as a control stick directly into the rudder lever means of a standard automatic pilot, the operation thereof is extremely difficult then, frequently even impossible, since the control stick then has to continuously follow the relatively quick stabilizing movements of the rudder servomotor when the automatic pilot is connected. Through distribution of the correcting movement on a servomotor operating with a relatively high frequency, the quick stabilizing movements are made not to affect the steering signal pick-up. In a further modication of the invention, provision is therefore made that the steering signal pick-up is arranged in the rudder lever means between the control stick and the servomotor controlled by the position pick-off, whereby a steering signal which can be impressed on the gyroscope and therein generates a torque, can be fed.

Referring now more particularly to FIG. 1, a gyroscope rotor driven in a well known manner is supported in a casing 1. The casing 1 is supported rotatably relative to a precession axis 2 in a frame (not shown) which is arranged stationarily relative to the airplane. A cross-type support 3 is connected with the precession axis 2, to the horizontal arms of which pistons 4 and 4' respectively are hinged. The pistons 4, 4' are closely sliding in cylinders 5, each respectively, each cylinder being affixed to the frame (of which cylinders only one is shown).

Each of the cylinders 5 is provided with an air outlet opening 7 controlled by a fine-set adjustable throttling screw 6. A rotor 8' of an inductive position pick-off system 8 is mounted on the precession axis 2, the stator 8" of which is rigidly supported in the frame. Rotor 8' is provided with individual iron armatures 9 which rotate relative to the poles of a winding of the stator 8", energized with alternating current. A pick-off system 8 of this type is described in detail in German patent application M 39,066 VIII*b*/21*c*. An alternating voltage is induced in a winding of the stator 8", which is proportional to the angle of rotation of the rotor 8'.

Additionally, a dynamic pick-off system 10 is connected with the precession axis 2, which simultaneously serves as torque generator. The pick-off system consists of a coil body mounted on the precession axis, which coil body is formed of several self-supporting coils 11, 11', 11" and a permanent magnet 12 which is redially arranged within the coil body and stationary relative to the frame, which magnet has alternating north and south poles, as well as a cylindric iron yoke 13 enclosing the coil body. A dynamic pick-off system 10 of this type is described in the German patent application M 38,242 IX/42*d*.

If the coil body is rotated relatively to the permanent magnet 12, then a voltage is induced in the individual coils 11, 11', 11", which is proportional to the rotative speed. If, however, a coil 11, 11', 11" is supplied with D.C. voltage, a torque is generated at the coil body and the precession axis 2, respectively. Thus, a portion of the coils 11, 11', 11" may be used as pickoff coils and the remaining coils as torque generator through D.C. voltage supply. If the aircraft executes a turn about the response axis which is perpendicular to the axis of rotation of the gyro and to the precession axis 2, then, as is well known, a precession torque proportional to the rate of turn is generated at the precession axis 2.

Assuming that the air discharge opening 7 of the damping cylinders 5 be closed at first, then, the air volume trapped in the cylinder 5 by the piston 4 and 4', respectively, is compressed under the influence of the precession torque and acts as air spring. Therefore, the precession deflection is proportional to the rate of turn. If, however, the air discharge opening 7 is not completely closed off by the throttling screw 6, then a specific adjustable air volume is discharged from the cylinder 5 under the influence of the precession torque. Thereby an integration of the precession torques is effected so that the precession deflection becomes also dependent on the integral of rate of turn, that is to say, the position error. The precession deflection of the precession axis 2, therefore, corresponds to a sum value composed of rate of turn and position error. By means of the position pick-off system 8 a signal proportional to this sum value may be derived. Simultaneously, however, a signal is obtained from the dynamic pick-off 10, which corresponds to the differential quotient of this sum value, thus rate of turn plus acceleration of turn.

The block diagram (FIG. 2) shows the described gyroscope arrangement as block 14. Reference character *a* designates the gyroscope itself; *b* the described pneumatic fettering and integrating device; reference character *c* corresponds to the position pick-off 8 in FIG. 1; *d* is the dynamic pick-off 10 in FIG. 1; and reference character *e* is the portion of the pick-off system 10 connected as torque generator.

Two servomotors 17, 18 engage at the rudder 15 of the aircraft through a known summation lever means 16 (three-point lever means). Between the servomotor 17 and the summation lever means 16 a control stick 19 designed as steering signal pick-up is connected, which is supported as at 20 and is synchronous with the movements of the servomotor 17. The servomotor 17 is controlled by the signal derived from the position pick-off *c* (8 in FIG. 1) through a power amplifier 21, whose signal corresponds to the position deviation plus rate of turn. However, the servomotor 18 is controlled by the signal obtained from the dynamic pick-off *d* (10 in FIG. 1) through a power amplifier 22, which signal represents the rate of turn plus acceleration of turn. The intense and rapid movements of the servomotor 18, which are required for stabilization, thus do not affect the servomotor 17 and the control stick 19. By means of the control stick 19 the airplane pilot may manually control the steering or monitor the operation of the automatic pilot. By means of the control stick 19, it is, however, also possible to feed steering signals in the known manner, which may be impressed on the torque generator *e* of the gyroscope system.

In the foregoing, I have described the preferred embodiments of my invention, and the best mode presently known to me for practising the same. It should be understood, however, that modifications and changes may be made without departing from the spirit and scope of my invention, as will be clear to those skilled in the art.

I claim:

1. In an automatic pilot for flying craft, in combination, a control surface element, a pair of servo-motors for maintaining the position of said element, a gyroscope mounted for limited rotation about a precession axis, means for deriving from said gyroscope a first signal indicating position derivation, said gyroscope having an inductive pick-off for delivering a second signal indicating rate of change of position, said inductive pick-off having a multiplicity of windings, some of which are connected to serve as a pick-off, and means for supplying direct current to others of said windings to produce torque generation therefrom.

2. A single gyro, position, and rate-of-change unit, comprising, in combination, a gyro, mounted for limited rotation about a precession axis, a position pick-off mounted on said precession axis and having a portion mounted on one side of said gyro and comprising throttled air damping means, and an inductive pick-off mounted on the opposite side of said gyro and having a portion mounted on said gyro, said inductive pick-off having a multiplicity of windings, some of which are connected as pick-off windings, a source of direct current, and means for supplying current therefrom to others of said windings to energize the latter to act as a torque generator.

References Cited by the Examiner

UNITED STATES PATENTS

| | | | |
|---|---|---|---|
| 1,831,597 | 11/1931 | Henderson | 33—204.15 |
| 2,590,428 | 3/1952 | Noxon | 33—204.15 |
| 2,766,627 | 10/1956 | Lower et al. | 74—5.5 X |
| 3,100,861 | 8/1963 | Osder | 244—77 X |

FOREIGN PATENTS 515,123 11/1939 Great Britain.

FERGUS S. MIDDLETON, *Primary Examiner.*

ANDREW H. FARRELL, MILTON BUCHLER,
*Examiners.*